(12) United States Patent
Spinelli

(10) Patent No.: US 11,439,936 B2
(45) Date of Patent: Sep. 13, 2022

(54) SEPARATOR FOR A GASEOUS FLUID

(71) Applicant: Marzio Spinelli, Briosco (IT)

(72) Inventor: Marzio Spinelli, Briosco (IT)

( * ) Notice: Subject to any disclaimer, the term of this patent is extended or adjusted under 35 U.S.C. 154(b) by 93 days.

(21) Appl. No.: 17/149,778

(22) Filed: Jan. 15, 2021

(65) Prior Publication Data
US 2021/0275950 A1  Sep. 9, 2021

(30) Foreign Application Priority Data

Mar. 6, 2020  (IT) .................. 102020000004759

(51) Int. Cl.
*A47L 5/36* (2006.01)
*B01D 45/16* (2006.01)
*B01D 45/12* (2006.01)

(52) U.S. Cl.
CPC ............. *B01D 45/16* (2013.01); *B01D 45/12* (2013.01)

(58) Field of Classification Search
CPC ........ B01D 45/16; B01D 45/12; B01D 50/20; B03B 5/34; F01M 2013/0427; F23J 15/027
See application file for complete search history.

(56) References Cited

U.S. PATENT DOCUMENTS

| 4,212,653 A | 7/1980 | Giles | |
| 4,927,437 A * | 5/1990 | Richerson | B01D 45/16 55/459.3 |
| 5,314,529 A * | 5/1994 | Tilton | B01D 45/16 96/204 |
| 5,460,147 A * | 10/1995 | Bohl | B01D 45/12 55/DIG. 19 |
| 6,752,856 B1 | 6/2004 | Graze, Jr. | |
| 9,242,196 B2 * | 1/2016 | Abayev | B01D 45/08 |

(Continued)

FOREIGN PATENT DOCUMENTS

| CN | 105664535 A | * | 6/2016 | ......... B01D 17/0208 |
| CN | 106178786 A | * | 12/2016 | |
| CN | 112156565 A | * | 1/2021 | |

(Continued)

OTHER PUBLICATIONS

Search Report dated Sep. 23, 2020 in Italian Patent Application No. 202000004759, 2 pages (with English translation of categories).

*Primary Examiner* — Dung H Bui
(74) *Attorney, Agent, or Firm* — Element IP, PLC

(57) ABSTRACT

A separator separating liquid or solid pollutants in a gaseous fluid flow contains a protective casing having an inlet and outlet ports, an upper outlet disk and a lower discharge disk inside the protective casing, and a separator device between the outlet disk and the discharge disk. The inlet port is hollowed in a vertical wall of the protective casing; the outlet disk includes a central through opening at the outlet port; and there are multiple discharge ports hollowed inside the discharge disk and on the annular edge of the discharge disk, respectively. An upper space separates the outlet disk from the separator device. The inlet port allows the gaseous fluid flow to pass into the upper space. The separator device has vertical walls wound around a vertical longitudinal axis leaving a central space therein to form at least one spiral that has a particular structure and forms a conduit.

13 Claims, 3 Drawing Sheets

(56) References Cited

U.S. PATENT DOCUMENTS

2018/0078890 A1* 3/2018 Roston .................. F24F 8/10
2019/0086075 A1* 3/2019 Albert .................. A23L 5/13

FOREIGN PATENT DOCUMENTS

| DE | 102013204392 A1 | 9/2014 | | |
|----|----|----|----|----|
| EP | 1199095 B1 | 4/2002 | | |
| EP | 1407807 A1 * | 4/2004 | ............ | B01D 45/16 |
| WO | WO-2017181236 A1 | 10/2017 | | |
| WO | WO-2020049587 A1 * | 3/2020 | ............ | B04C 5/103 |

* cited by examiner

SEPARATOR FOR A GASEOUS FLUID

The present invention refers to a separator for a gaseous fluid.

In the state of the art, separators for gaseous fluids adapted to separate liquids or solids transported by flows of gaseous fluids are known.

In particular, a separator as described in EP 1199095 B1 is known.

Disadvantageously, it has been noted that the abatement efficiency of solid particles greater than or equal to 1 micron is nominal around 99% only as long as a concentration by weight of the solid particles is lower than 7 g/Sm$^3$. As the concentration by weight of the solid particles increases, the abatement efficiency drops and is reduced to around 80% of solid particles with sizes greater than or equal to 1 micron. In particular, it has been noted that over the duration time of a pipe of a gas pipeline the concentration by weight of iron oxides that are formed by corrosion of the conduits increases and it often happens that it is necessary to separate gaseous fluids from solid particles in much higher concentration by weight ranging on average between 20 and 50 g/Sm$^3$.

Other known state-of-the-art separators comprise an inlet of the gaseous fluid at the height of a spiral of the separator device, but disadvantageously in the case of the presence of large particles and of concentrations by weight of solid particles higher than 7 g/Sm$^3$ in the flow of the gaseous fluid, which can be defined as high concentrations by weight, there is a strong wear of the separator device and consequently a potential damage to the spiral.

Other known state-of-the-art separators comprise an inlet of the flow of gaseous fluid arranged below the spiral and therefore require additional components which in the presence of high concentrations by weight of solid particles are less efficient since the particles disadvantageously accumulate without being separated from the gaseous fluid until they fall by gravity towards an ascending current generated by the additional components, which pushes the particles out together with the flow of gaseous fluid without effectively separating the gaseous fluid from the solid pollutants.

Furthermore, an inlet of the gaseous fluid placed under the separation device tends to push the smaller and lighter solid particles towards an upper portion of the separation device, reducing the separation efficiency as the lighter particles are trapped in a vortex that is generated in an upper corner of the separator device and are not able to be ejected downwards.

The purpose of the present invention consists in realising a separator for gaseous fluid which allows to separate liquid or solid pollutants by abating 99% of the solid or liquid particles greater than or equal to 1 micron even in conditions of high concentrations by weight higher than 7 g/Sm$^3$ of solid particles mixed in the gaseous fluid, reducing the wear of the separator and solving the disadvantages of the prior art.

According to the invention, this object is achieved with a separator for a gaseous fluid according to claim 1.

Other features are envisaged in the dependent claims.

The features and advantages of the present invention will be more apparent from the following description, which is to be understood as exemplifying and not limiting, with reference to the appended schematic drawings, wherein:

FIG. 1 is a perspective and transparency view of a separator for a gaseous fluid according to the present invention which separates a liquid or a solid transported by a flow of the gaseous fluid, comprising a protective casing comprising an inlet port and an outlet port, an upper outlet disk and a lower discharge disk arranged inside the protective casing, wherein the upper outlet disk comprises a central through opening at the outlet port, wherein the lower discharge disk comprises a multiplicity of discharge ports, a separator device arranged inside the protective casing between the upper discharge disk and the lower discharge disk, the upper outlet disk being separated by a space from the separator device, a flow diverter inserted in the space between the upper outlet disk and the separator device to divert the flow of the gaseous fluid entering from the inlet port, wherein the separator device comprises vertical walls wound so as to form a spiral comprising a multiplicity of turns spaced from each other by a constant pitch, wherein the spiral forms a conduit comprising a rectangular longitudinal section in which a minor side of the longitudinal section of the conduit is the pitch of the spiral and a longer side of the longitudinal section of the conduit is a height of the separator device, a multiplicity of flow diverting fins mounted with the through opening of the conduit and spaced from each other by vertical spaces;

Figure 1:
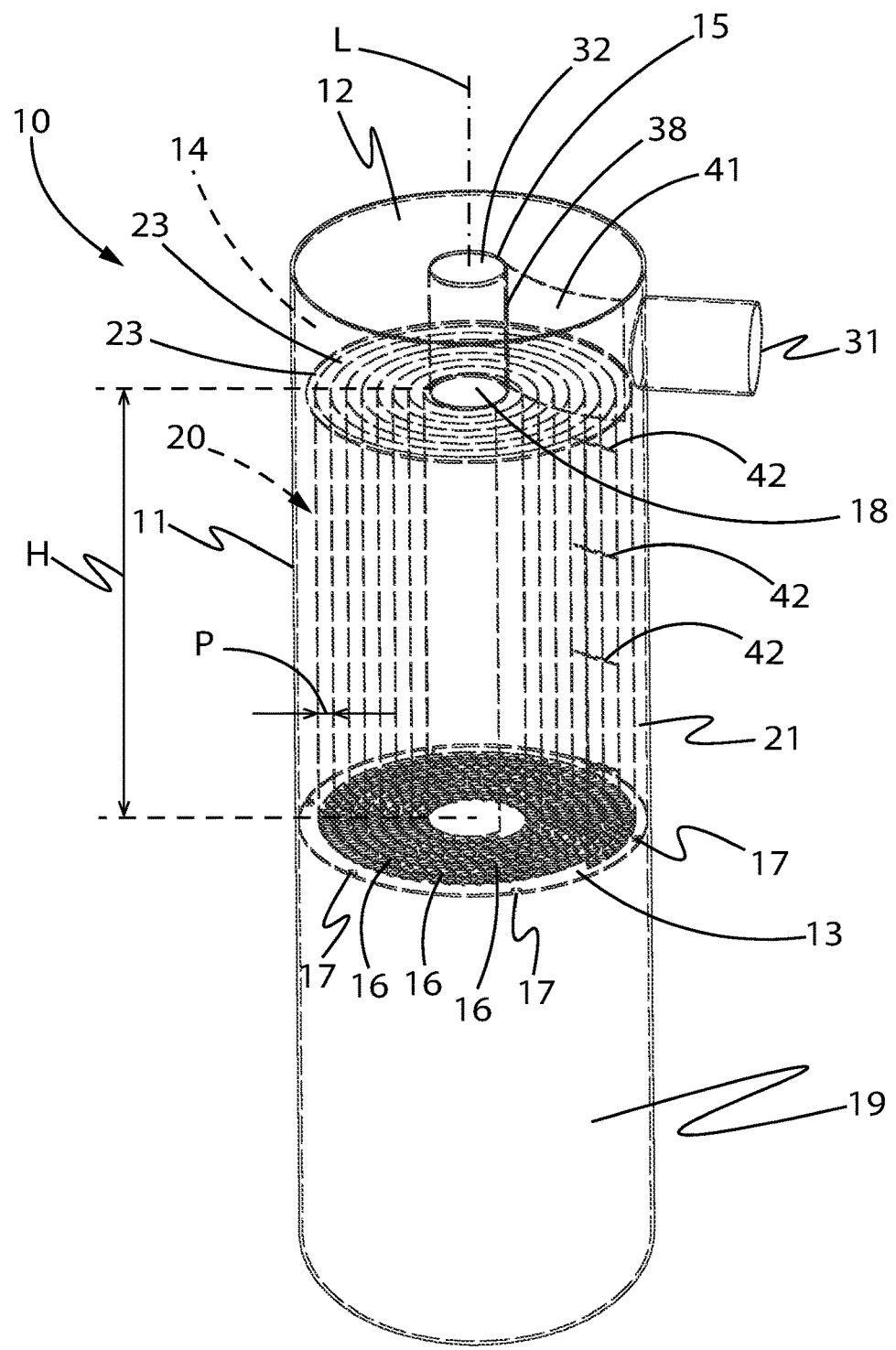
Figure 2:
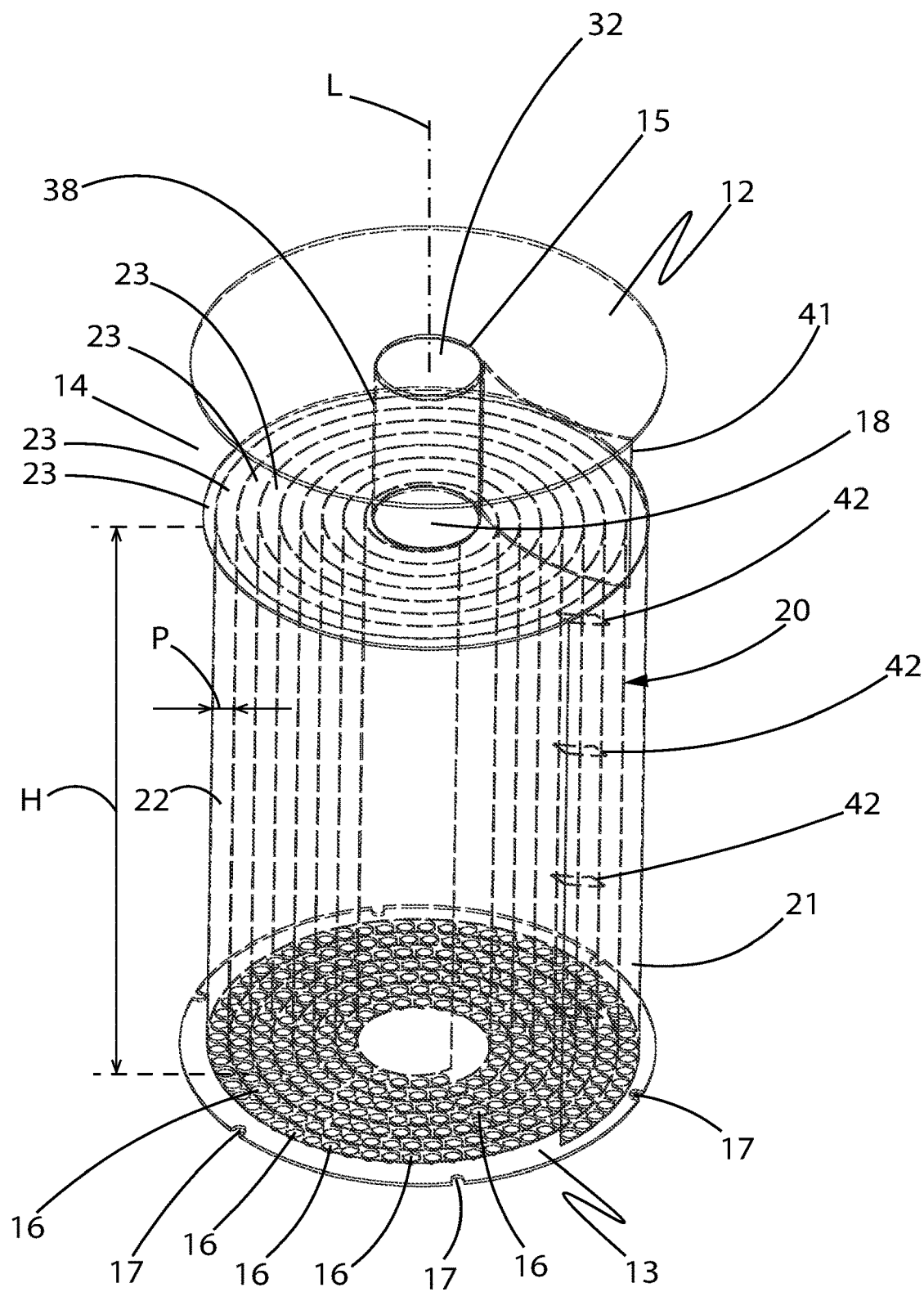
FIG. 2 is a perspective view of a detail of FIG. 1 showing the separator device mounted between the upper outlet disk, the flow diverter and the lower discharge disk.

With reference to the figures and in particular the cited FIGS. 1 and 2, a separator 10 for a gaseous fluid which separates liquid or solid pollutants entrained by a flow of the gaseous fluid is shown.

The separator 10 comprises a protective casing 11 which defines an internal space of the separator 10.

The protective casing 11 comprising an inlet port 31 and an outlet port 32 adapted to allow a passage of the flow of the gaseous fluid.

The separator 10 comprises an upper outlet disk 12 and a lower discharge disk 13 arranged inside the protective casing 11.

The upper outlet disk 12 comprises a through opening 15 that is central to the upper outlet disk 12 and which is located at the outlet port 32 of the protective casing 11.

The lower discharge disk 13 comprises a multiplicity of discharge ports 16, 17, a first multiplicity of discharge ports 16 which is hollowed inside the lower discharge disk 13 and a second multiplicity of discharge ports 17 hollowed on an annular edge of the lower discharge disk 13.

The separator 10 comprises a separator device 20 arranged inside the protective casing 11 between the upper outlet disk 12 and the lower discharge disk 13.

The upper outlet disk 12 is separated by an upper space 14 from the separator device 20.

The separator 10 comprises a flow diverter 41 inserted in the upper space 14 between the upper outlet disk 12 and the separator device 20. The flow diverter 41 diverts the flow of the gaseous fluid entering from the inlet port 31.

Advantageously, the flow diverter 41 comprises a convex wall which diverts the gaseous fluid entering from the inlet port 31 and rotates the gaseous fluid entering from the inlet port 31 in a direction of rotation which corresponds to a direction of winding of the turns 23 of the spiral of the separator device 20 by exploiting an agglomeration effect of solid particles mixed in the gaseous fluid due to a centrifugal force caused by rotation.

In particular, FIG. 1 shows a cylindrical portion of the separator 10 which is that portion of the separator 10 containing in its inside the separator device 20, in which a vertical wall of the cylindrical portion of the separator 10 represents a vertical wall of the protective casing 11 of the separator 10. The cylindrical portion of the separator 11 containing in its inside the separator device 20 comprises an axis of geometric symmetry which is a longitudinal geometric axis L arranged vertically with respect to a soil.

The inlet port 31 is hollowed in the vertical wall of the protective casing 11 and is adapted to let the flow of gaseous fluid pass into the upper space 14 arranged between the upper outlet disk 12 and the separator device 20 to let the flow of the gaseous fluid pass through the separator device 20.

Advantageously, the position of the inlet port 31 above the separator device 20 and the pressure difference generated by the presence of the second multiplicity of discharge ports 17 contribute to pushing solid particles towards a lower portion of the separator device 20, significantly reducing a quantity of direct solid particles towards an upper portion of the separator device 20.

The outlet port 32 is at the central through opening 15 of the upper outlet disk 12 and is adapted to let the flow of cleaned gaseous fluid which has passed through the separator device 20 exit from the separator 10.

The separator device 20 comprises vertical walls 21 wound around the longitudinal geometric axis L forming at least one spiral comprising a multiplicity of turns 23. The vertical walls 21 of the at least one spiral are spaced from each other by a constant pitch, wherein the at least one spiral forms a conduit 22 comprising a rectangular longitudinal section, in which a minor side P of the longitudinal section of the conduit 22 is a transverse distance between two adjacent vertical walls 21 and a longer side H of the longitudinal section of the conduit 22 is a height of the vertical walls 21 of the separator device 20, in which the height is measured along a parallel to the longitudinal geometric axis L. The transverse distance is measured on a transverse geometric plane to which the longitudinal geometric axis L is perpendicular.

FIG. 2 shows an embodiment example with a single spiral. In the case of a single spiral, the number of turns 23 is comprised between six and eight.

In the case of a single spiral shown in FIG. 2, the transverse distance between the adjacent vertical walls 21 corresponds to the pitch of the turn 23 of the spiral.

Figure 3:
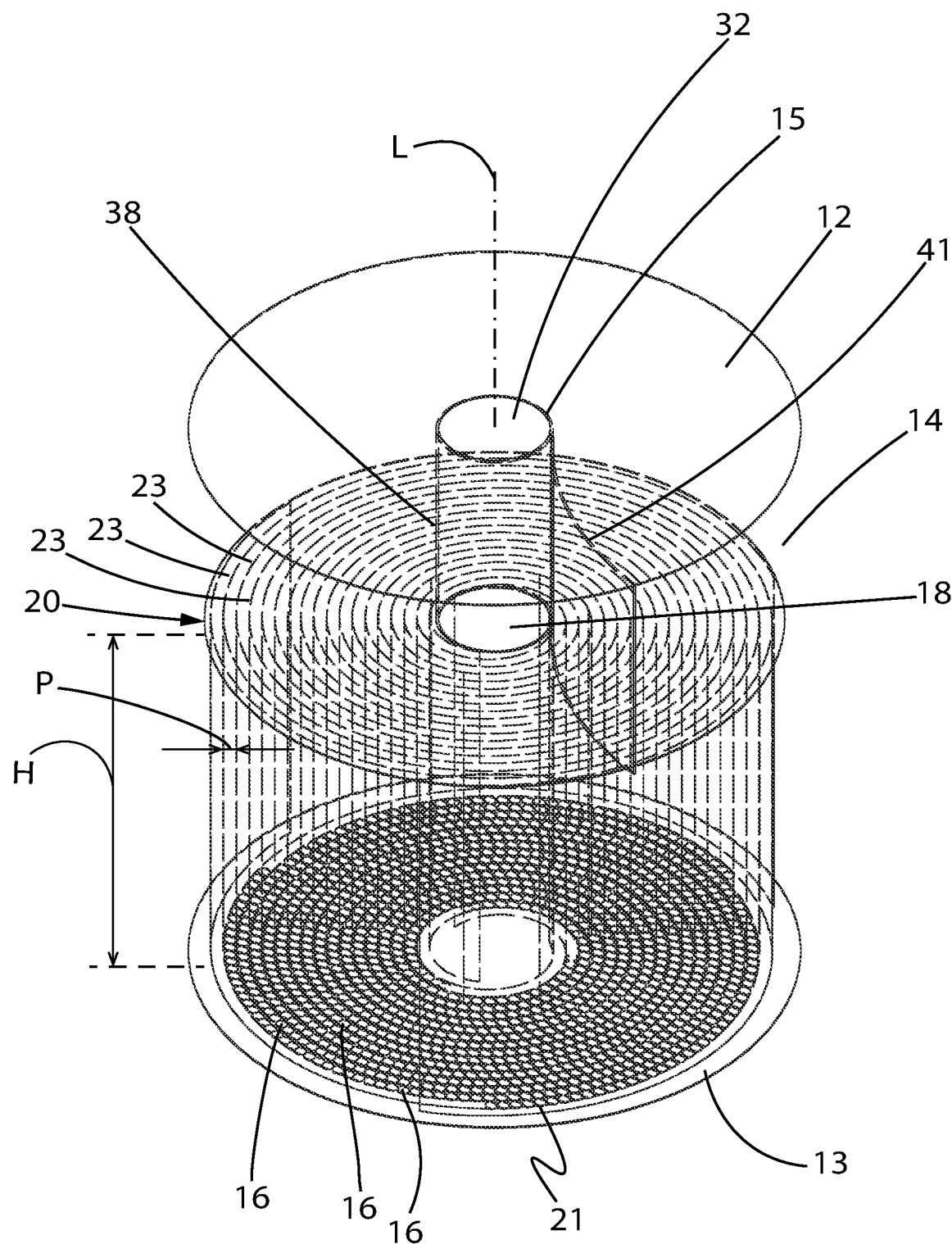
FIG. 3 is a perspective view of an alternative separator device comprising a multiplicity of concentric spirals, in particular three concentric spirals are shown in the figure.

Alternatively, FIG. 3 shows three sheets which constitute vertical walls 21 wound around the longitudinal geometric axis L so as to form three concentric spirals. Each spiral comprises a geometric centre arranged on the longitudinal geometric axis L. Each spiral preferably comprises a number of turns 23 comprised between four and eight, so that when the spirals are penetrated together, the turns 23 create a conduit 22. The three concentric spirals and their turns 23 form the single rectangular conduit 22, which is defined by the adjacent vertical walls 21.

FIG. 3 shows an embodiment example comprising three concentric spirals but it is possible to envisage that the number of concentric spirals can be comprised between three, two and six.

The longitudinal section of the conduit 22 is shown in the figures and lies on a longitudinal geometric plane which comprises the longitudinal geometric axis L and is perpendicular to the soil.

In FIGS. 1 and 2 the spiral shape of the separator device 20 is evident by cutting the separator device 20 along a transverse geometric plane which is perpendicular to the longitudinal geometric axis L and is parallel to the soil.

The first multiplicity of discharge ports 16 is hollowed in the lower discharge disk 13 at the turns 23 of the spiral of the separator device 20 so that the first multiplicity of discharge ports 16 is distributed following the geometry of the at least one spiral.

Preferably, the diameter of the first discharge ports 16 is substantially equal to the transverse distance between two of the adjacent vertical walls 21 so as to advantageously maximize the discharge of polluting liquids and solids from the lower discharge disk 13.

The first multiplicity of discharge ports 16 advantageously allows to let liquids or solids transported by the flow of the gaseous fluid and separated from the gaseous fluid pass through by means of the separator 10 according to the present invention.

The second multiplicity of discharge ports 17 advantageously allows to discharge liquids or solids of the flow of the gaseous fluid which has been channeled between an internal vertical wall of the protective casing 11 and the separator device 20. A transverse distance between the internal vertical wall of the protective casing 11 and the external vertical wall 21 of the spiral of the separator device 20 corresponds to a section of transverse passage of the inlet port 31, wherein section of transverse passage of the inlet port 31 refers to a transverse space comprised between a mouth of the inlet port 31 and the external vertical wall 21, in which the transverse space is measured on a transverse geometric plane.

Advantageously, the second multiplicity of discharge ports 17 contributes to creating a pressure difference which pushes the gaseous fluid downwards and further helps to carry liquids or solids or particles towards a lower portion of the separator device 20.

Even more advantageously, the second multiplicity of discharge ports 17 allows to eject solid particles of greater sizes even before they enter the turns 23 of the separator device 20, favouring a very useful pre-separation when there is a high concentration of solid particles inside the gaseous fluid.

The liquids and the solids coming out through the multiplicity of discharge ports 16, 17 end up in an accumulation tank 19 in order to then be drained.

Advantageously, the separator device 20 comprises a diameter such as to occupy an internal diameter of the protective casing 11 of the separator 10.

The vertical walls 21 of the separator device 20 wind around the longitudinal geometric axis L leaving in their inside a central longitudinal space 18 which comprises a diameter equal to that of the through opening 15 of the upper outlet disk 12.

The separator 10 comprises an outlet conduit 38 which is arranged along the longitudinal geometric axis L inside the upper space 14 and which connects the through opening 15 of the upper outlet disk 12 with the central space 18 of the spiral of the separator device 20.

The separator 10 comprises a multiplicity of flow diverting fins 42 which are mounted at the inlet of a rectangular through opening of the conduit 22. The rectangular through opening of the conduit 22 lies on a longitudinal geometric plane of the conduit 22.

The flow diverting fins 42 are spaced from each other by a vertical distance which is measured on a parallel of the longitudinal geometric axis L.

The flow diverting fins 42 comprise a length comprised between 10 and 100 mm based on the dimensions of the separator 10. In particular, FIGS. 1 and 2 show four flow diverting fins 42 which are inclined by 30 sexagesimal degrees with respect to a transverse geometric plane which is parallel to the soil. The flow diverting fins 42 are spaced from each other by the same vertical distance.

Advantageously, the flow diverting fins 42 allow the flow of the gaseous fluid entering the conduit 22 to be more diverted towards the first multiplicity of discharge ports 16, further favouring the ejection of liquids or solids or particles within the first turns of the spiral.

The separator device 20 comprises a greater number of turns 23 than separators of the prior art.

In particular, it is possible to quantify the number of turns 23 by relating it to a P/H ratio between the dimensions of the conduit 22, i.e. a ratio between the smaller side P and the longer side H of the conduit 22.

The P/H ratio directly depends on an effective volumetric flow rate measured in cubic meters per hour and inversely depends on an average flow rate of the gaseous fluid at the entrance of the rectangular through opening of the conduit 22 measured in meters per second.

Preferably the P/H ratio is comprised between 0.03 and 0.06.

Advantageously, the separator 10 according to the present invention allows the gaseous fluid to be cleaned from liquids or solids or solid particles with a very high efficiency, i.e. eliminating 99% of the solid particles having dimensions higher than or equal to 1 micron.

Advantageously, the separator 10 allows to effectively clean the gaseous fluid by means of the sole use of fluid-dynamic currents generated thanks to the geometric shape of the separator 10.

Advantageously, the separator 10 according to the present invention allows the gaseous fluid to be separated more effectively and efficiently from the polluting liquids or solids even when the concentration by weight of the solid particles mixed in the gaseous fluid is high and is higher than 7 g/Sm$^3$, contrary to what happens in the state of the prior art.

Advantageously, the separator 10 according to the present invention allows to reduce the wear of the separator device 20.

Advantageously, the greater number of concentric spirals allows to reduce the dimensions of the separator 10 with respect to other solutions of the state of the prior art in which spirals are arranged in parallel with each other, and this, especially in conditions of high pressures, significantly reduces the cost of the tank.

Advantageously, the separator 10 according to the present invention allows to obtain rising currents with a more ordered, more laminar and less turbulent flow of the gaseous fluid, contributing to increase the separation efficiency as the likelihood that smaller and lighter particles can be dispersed and rise towards the outlet port 32 is reduced.

Advantageously, under the lower discharge disk 13 there are no hoppers or other devices that can form cyclonic vortices, so as to avoid creating accumulations of particles when the concentration by weight of the solid particles mixed in the gaseous fluid is high. The absence of devices that create cyclonic vortices is advantageous for increasing the cleaning efficiency of the gaseous fluid decreasing the presence of lighter solid particles and is useful for decreasing the wear of the separator device 20.

Alternatively, it is possible to provide for the vertical walls 21 of the separator device 20 to be wound so as to form spirals, wherein each spiral comprises a multiplicity of turns 23 spaced from each other by a predefined pitch which may even not be a constant pitch, but vary according to a geometry predefined by a manufacturer.

Alternatively, the diameter of the first discharge ports 16 is lower than the transverse distance between two of the adjacent vertical walls 21.

Alternatively, it is provided that the vertical distance between the flow diverting fins 42 is not constant, but varies according to the experimental parameters of deviation of the flow of the gaseous fluid.

Alternatively, provision is made for the flow diverting fins 42 of the multiplicity of flow diverting fins 42 to be inclined by an acute angle with respect to a transverse geometric plane which is parallel to the soil.

The invention thus conceived is susceptible to many modifications and variants, all falling within the same inventive concept; furthermore, all details can be replaced by equivalent technical elements. In practice, the materials used, as well as the dimensions thereof, can be of any type according to the technical requirements.

The invention claimed is:

1. A separator for a gaseous fluid adapted to separate liquid or solid pollutants entrained by a flow of the gaseous fluid, the separator comprising:
    a protective casing comprising an inlet port and an outlet port, wherein the inlet port is hollowed in a vertical wall of the protective casing;
    an upper outlet disk and a lower discharge disk arranged inside the protective casing, wherein the upper outlet disk comprises a central through opening at the outlet port, the lower discharge disk comprises multiple first discharge ports and multiple second discharge ports, the first multiplicity of discharge ports are hollowed inside the lower discharge disk, and the second discharge ports are hollowed on an annular edge of the lower discharge disk; and
    a separator device arranged inside the protective casing between the upper outlet disk and the lower discharge disk, wherein the upper outlet disk is separated by an upper space from the separator device,
    wherein the inlet port is adapted to let the flow of the gaseous fluid pass into the upper space, and
    wherein the separator device comprises vertical walls wound around a vertical longitudinal geometric axis leaving a central longitudinal space therein so as to form at least one spiral that comprises multiple turns spaced from each other by a predefined pitch and forms a conduit comprising a rectangular longitudinal section in which a short side of the longitudinal section is a transverse distance between two of the vertical walls which are adjacent and a long side of the longitudinal section is a height of the vertical walls.

2. The separator according to claim 1, wherein the first discharge ports are hollowed in the lower discharge disk at the turns of the at least one spiral of the separator device so that the first discharge ports are distributed following the geometry of the at least one spiral.

3. The separator according to claim 2, wherein each of the first discharge ports has a diameter which is substantially equal to the transverse distance between the two adjacent vertical walls.

4. The separator according to claim 1, further comprising:
    a flow diverter inserted in the upper space between the upper outlet disk and the separator device, wherein the flow diverter comprises a convex wall to divert the flow of the gaseous fluid entering from the inlet port and to rotate the flow in a direction of rotation which corresponds to a direction of winding of the turns of the at least one spiral of the separator device.

5. The separator according to claim 1, further comprising:
multiple flow diverting fins mounted at an inlet of a rectangular through opening of the conduit, wherein the rectangular through opening of the conduit lies on a longitudinal geometric plane of the conduit, and the multiple flow diverting fins are spaced from each other by a vertical distance measured parallel to the vertical longitudinal geometric axis.

6. The separator according to claim 5, wherein the flow diverting fins are inclined by an acute angle with respect to a transverse geometric plane parallel to a soil.

7. The separator according to claim 5, wherein the flow diverting fins are spaced from each other by the same vertical distance.

8. The separator according to claim 1, wherein a transverse distance between an internal vertical wall of the protective casing and a more external vertical wall of the at least one spiral of the separator device corresponds to a section of transverse passage of the inlet port.

9. The separator according to claim 1, wherein the central longitudinal space has a diameter equal to that of the central through opening of the upper outlet disk.

10. The separator according to claim 1, further comprising:
an outlet conduit which is arranged along the vertical longitudinal geometric axis inside the upper space and connects the central through opening of the upper outlet disk with the central longitudinal space of the at least one spiral of the separator device.

11. The separator according to claim 1, wherein a P/H ratio of the short side to the long side of the conduit ranges between 0.03 and 0.06.

12. The separator according to claim 1, the wherein a number of the turns of the at least one spiral ranges between six and eight.

13. The separator according to claim 1, comprising
from two to six concentric spirals wherein each spiral of the concentric spirals is one of said at least one spiral.

* * * * *